United States Patent
Do

(10) Patent No.: US 7,508,786 B2
(45) Date of Patent: Mar. 24, 2009

(54) MOBILE COMMUNICATION SYSTEM AND METHOD FOR EXCHANGING DATA BETWEEN MOBILE COMMUNICATION TERMINALS USING PACKET DATA COMMUNICATION

(75) Inventor: Shin-Hee Do, Seoul (KR)

(73) Assignee: Samsung Electronics Co., Ltd (KR)

( * ) Notice: Subject to any disclaimer, the term of this patent is extended or adjusted under 35 U.S.C. 154(b) by 534 days.

(21) Appl. No.: 10/925,616

(22) Filed: Aug. 25, 2004

(65) Prior Publication Data

US 2005/0135294 A1    Jun. 23, 2005

(30) Foreign Application Priority Data

Dec. 23, 2003   (KR) ................. 10-2003-0095461

(51) Int. Cl.
    H04L 12/28    (2006.01)
(52) U.S. Cl. ............... 370/328; 370/413; 370/400; 455/466; 455/432.1; 455/446; 455/458; 455/414.1
(58) Field of Classification Search .............. 370/328, 370/338, 400, 252; 455/466, 432.1, 446, 455/436.1, 458, 414.1
    See application file for complete search history.

(56) References Cited

U.S. PATENT DOCUMENTS

| | | | |
|---|---|---|---|
| 2001/0024951 A1* | 9/2001 | Rignell et al. ............... 455/414 |
| 2002/0035605 A1* | 3/2002 | McDowell et al. ........... 709/206 |
| 2002/0086672 A1* | 7/2002 | McDowell et al. ........... 455/432 |
| 2003/0013467 A1* | 1/2003 | Caloud ........................ 455/466 |
| 2003/0021256 A1* | 1/2003 | Lee ............................. 370/342 |
| 2003/0142654 A1* | 7/2003 | Chambers et al. ............ 370/338 |
| 2004/0029585 A1* | 2/2004 | Akgun et al. ............. 455/432.2 |
| 2004/0103196 A1* | 5/2004 | Block et al. ................. 709/227 |
| 2004/0128310 A1* | 7/2004 | Zmudzinski et al. ......... 707/102 |

FOREIGN PATENT DOCUMENTS

KR    1020040108104    12/2004

\* cited by examiner

*Primary Examiner*—Rafael Pérez-Gutiérrez
*Assistant Examiner*—Nimesh Patel
(74) *Attorney, Agent, or Firm*—The Farrell Law Firm, PC

(57) ABSTRACT

A mobile communication system and method for exchanging packet data between a host mobile communication terminal and at least one client mobile communication terminal. The host mobile communication terminal sends an SMS message including a list of data to be provided and an IP address for packet data communication. At least one client mobile communication terminal sends a list of data requested to be sent for downloading and authentication information to the host mobile communication terminal over PPP channels set up for the packet data communication. The host mobile communication terminal then sends the data requested by the client mobile communication terminal thereto over the PPP channels. Therefore, data can be exchanged between the host mobile communication terminal and the client mobile communication terminal, without using a separate physical device or means for data exchange.

12 Claims, 6 Drawing Sheets

MOBILE COMMUNICATION SYSTEM AND METHOD FOR EXCHANGING DATA BETWEEN MOBILE COMMUNICATION TERMINALS USING PACKET DATA COMMUNICATION

PRIORITY

This application claims priority to an application entitled "MOBILE COMMUNICATION SYSTEM AND METHOD FOR EXCHANGING DATA BETWEEN MOBILE COMMUNICATION TERMINALS USING PACKET DATA COMMUNICATION", filed in the Korean Intellectual Property Office on Dec. 23, 2003 and assigned Serial No. 2003-95461, the contents of which are hereby incorporated by reference.

BACKGROUND OF THE INVENTION

1. Field of the Invention

The present invention relates generally to a mobile communication system, and more particularly to a mobile communication system and method for directly exchanging data between mobile communication terminals using a packet data service.

2. Description of the Related Art

Currently, as a result of the development of the communication industry, code division multiple access (CDMA) mobile communication systems provide multicast multimedia communication services for sending of large-capacity data, such as packet data, circuit data, etc., as well as voice services.

Further, the more recently developed mobile communication terminals have performances and programs similar to personal computers. The improvements in mobility and performance of mobile communication terminals themselves promote the use of additional functions by users all the more. Additionally, mobile communication terminals store a large amount of data, such as telephone numbers, personal schedules, etc., and output or edit the stored data according to user requirements.

As mobile communication terminals have become necessities of life for modern people, users can exchange their essential contact information with one another by giving and receiving their own mobile communication terminal numbers. Further, mobile communication terminals can store not only telephone numbers, but also various data such as user addresses, Internet mail addresses, and even personal avatars.

In general, the exchange of data, such as address books, between users using mobile communication terminals can be made through the use of Internet mails or documents.

FIG. 1 illustrates an example of a conventional system for exchanging data between mobile communication terminals. As illustrated in FIG. 1, to exchange personal data between mobile communication terminals 12 and 14, a computer 10 is required for interconnecting the mobile communication terminals 12 and 14. Most commonly, a personal computer (PC) link program is installed in the computer 10 such that the computer 10 is connected with the mobile communication terminals 12 and 14 to exchange data therebetween. The computer 10 and the mobile communication terminals 12 and 14 are interconnected via separate data cables, respectively.

If the computer 10 receives a command to execute the PC link program under the condition of being connected with the first mobile communication terminal 12 via the corresponding data cable, then the computer 10 runs the PC link program, reads personal data stored in a memory (not illustrated) of the mobile communication terminal 12, and temporarily stores the read personal data therein.

Thereafter, upon receiving a command to store the personal data read from the first mobile communication terminal 12 into the second mobile communication terminal 14 connected via the corresponding data cable, the computer 10 writes the temporarily stored personal data into a memory (not illustrated) of the second mobile communication terminal 14.

A data exchange technique in the prior art is disclosed in Korean Patent Application No. 2003-0004137, entitled "System and Method for Supporting Multimedia Broadcast/Multicast Service in Non-Tracking Area" filed in the Korean Intellectual Property Office on Jan. 21, 2003, and assigned to the same assignee as the present application. This conventional technique illustrates only a scheme for automatically downloading multimedia data using a general voice traffic channel, without any description of a personal data sending scheme. That is, the general voice traffic channel described in this conventional technique does not support a personal data transmission/reception scheme.

In the above-mentioned conventional data exchange system, in order to exchange personal data between mobile communication terminals, a computer with a PC link program installed therein must be used as a mediator that is connected with the mobile communication terminals via corresponding data cables to read personal data stored in one of the terminals and write the read personal data into the other terminal, resulting in inconvenience of use and a higher cost burden.

In other words, a computer with a PC link program installed therein is required to read personal data from one mobile communication terminal and write the read personal data into the other mobile communication terminal. Further, separate data cables are required to connect the computer with the mobile communication terminals by wire. Moreover, to exchange personal data between mobile communication terminals, a computer with low mobility must be used as a data exchange mediator, causing great inconvenience in exchanging the personal data in real time as needed.

SUMMARY OF THE INVENTION

Therefore, the present invention has been designed in view of the above and other problems occurring in the prior art, and it is an object of the present invention to provide a mobile communication system and method for directly sharing and exchanging personal data between mobile communication terminals more simply and conveniently.

It is another object of the present invention to provide a mobile communication system and method for directly sharing and exchanging personal data between mobile communication terminals in real time.

It is yet another object of the present invention to provide a mobile communication system and method for directly sharing and exchanging personal data between mobile communication terminals more simply and conveniently, using packet data communication.

In accordance with an aspect of the present invention, the above and other objects can be accomplished by a mobile communication system for exchanging packet data between a host mobile communication terminal and at least one client mobile communication terminal, comprising: a packet data serving node (PDSN) for allocating first and second Internet protocol (IP) addresses to the host and client mobile communication terminals, respectively, and establishing first and second point-to-point protocol (PPP) channels with the host and client mobile communication terminals, respectively; a short message service (SMS) server for providing an SMS to the host and client mobile communication terminals; the host mobile communication terminal adapted for receiving the first IP address allocated from the PDSN, setting up the first PPP channel with the PDSN on the basis of the allocated first IP address, sending an SMS message containing the first IP address and a list of data to be provided, to the SMS server, and upon receiving a list of data requested to be sent existing in the list of the data to be provided, sending the data of the requested data list to the PDSN through an authentication process; and the at least one client mobile communication terminal adapted for receiving the second IP address allocated from the PDSN, setting up the second PPP channel with the PDSN on the basis of the allocated second IP address, sending a download request parameter containing the requested data list selected from the list of the data to be provided, to the host mobile communication terminal via the PDSN, and receiving the data of the requested data list sent from the host mobile communication terminal.

In accordance with another aspect of the present invention, there is provided a method for exchanging packet data between a host mobile communication terminal and at least one client mobile communication terminal using a mobile communication system, the mobile communication system including the host mobile communication terminal for providing data, the at least one client mobile communication terminal for receiving the data provided from the host mobile communication terminal, an SMS server for providing an SMS to the host and client mobile communication terminals, and a PDSN for allocating first and second IP addresses to the host and client mobile communication terminals to set up first and second PPP channels therewith, respectively, the method comprising the steps of: a) requesting, by the host mobile communication terminal, the first IP address from the PDSN and setting up the first PPP channel, if allocated the first IP address from the PDSN; b), by the host mobile communication terminal, sending), by the host mobile communication terminal, an SMS message containing the first IP address and a list of data to be provided, to the client mobile communication terminal via the SMS server; c) requesting, by the client mobile communication terminal, the second IP address from the PDSN upon receiving a signal to request sending of data corresponding to the list of the data to be provided, contained in the SMS message, setting up the second PPP channel, if allocated the second IP address from the PDSN, and sending a download request parameter containing a list of the requested data to the host mobile communication terminal via the PDSN; and d) sending, by the host mobile communication terminal, the data of the requested data list to the PDSN through an authentication process upon receiving the download request parameter.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Figure 1:
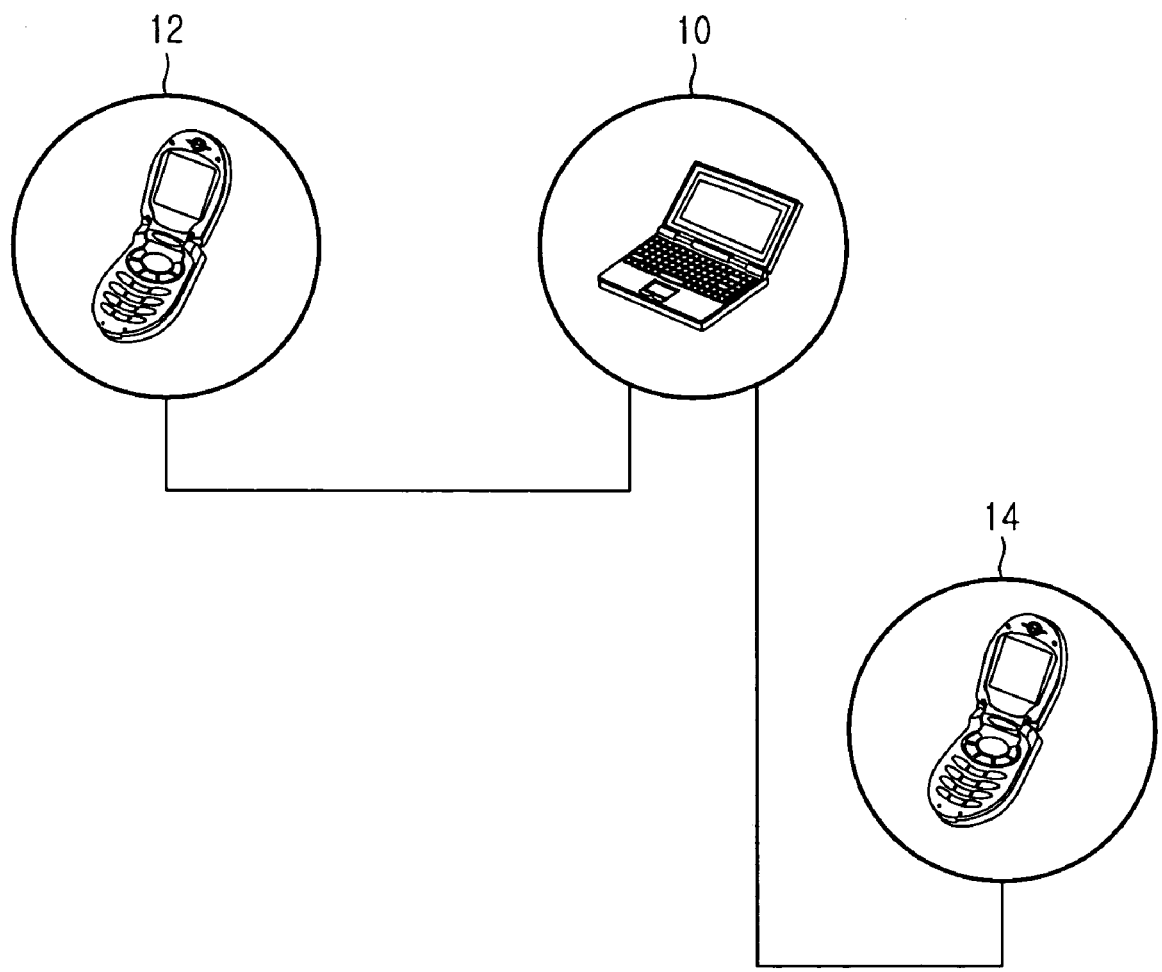
FIG. 1 illustrates an example of a conventional system for exchanging data between mobile communication terminals.

Preferred embodiments of the present invention will be described in detail herein below with reference to the annexed drawings. In the drawings, the same or similar elements are denoted by the same reference numerals even though they are depicted in different drawings.

Further, in the following description made in conjunction with preferred embodiments of the present invention, a variety of specific elements such as constituent elements of various concrete circuits are illustrated. The description of such elements has been made only for a better understanding of the present invention. Those skilled in the art will appreciate that the present invention can be implemented without using the above-mentioned specific elements.

Additionally, in the following description of the present invention, a detailed description of known functions and configurations incorporated herein will be omitted when it may make the subject matter of the present invention rather unclear.

The present invention proposes a scheme for exchanging data to be shared between mobile communication terminals. For example, a proposed scheme enables the chairman of an association to distribute an address book of the association stored in his/her mobile communication terminal to mobile communication terminals of the association members through inter-terminal data communication without using additional means, such as a PC link program and an inter-terminal connection mediator, for example, a computer.

Figure 2:
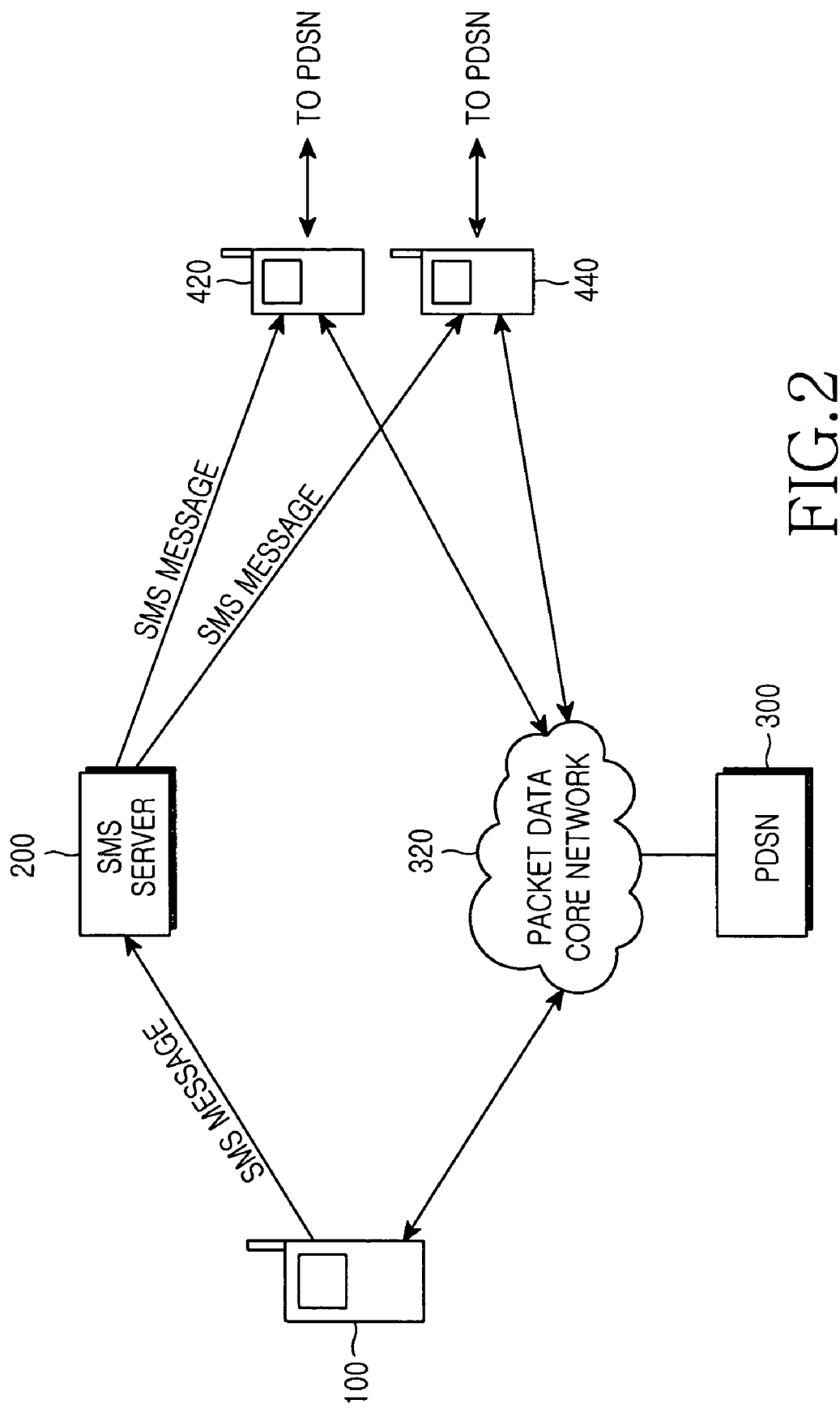
FIG. 2 is a block diagram illustrating a preferred embodiment of a mobile communication system using packet data communication according to the present invention.

FIG. 2 illustrates a block diagram of a preferred embodiment of a mobile communication system using packet data communication according to the present invention. As illustrated in FIG. 2, a host mobile communication terminal 100 and client mobile communication terminals 420 and 440 perform packet data communication therebetween by establishing point-to-point protocol (PPP) channels with a packet data serving node (PDSN) 300 through a packet data core network 320, respectively.

The host mobile communication terminal 100 includes a server program (typically called a "socket server application program") for managing transmission of data that is requested from each of the client mobile communication terminals 420 and 440 over the PPP channels, set up with the PDSN 300 through the packet data core network 320.

The client mobile communication terminals 420 and 440 each access the host mobile communication terminal 100 with the server program over the PPP channels, which are set up with the PDSN 300 through the packet data core network 320, to request it to send data. Accordingly, the client mobile communication terminals 420 and 440 each include a client program (typically called a "socket client application program") for accessing the host mobile communication terminal 100.

In order to exchange data between the host mobile communication terminal 100 and each of the client mobile communication terminals 420 and 440, as illustrated in FIG. 2, a short message service (SMS) server 200 is provided to exchange SMS messages between the host mobile communication terminal 100 and each of the client mobile communication terminals 420 and 440, and the PDSN 300 is connected with the packet data core network 320 for the packet data communication.

A detailed description will hereinafter be given of operations for exchanging packet data between the host mobile communication terminal 100 and each of the client mobile communication terminals 420 and 440.

1) An operation in which the host mobile communication terminal 100 notifies each of the client mobile communication terminals 420 and 440 of an Internet protocol (IP) address for the packet data communication The host mobile communication terminal 100 accesses the PDSN 300 via the packet data core network 320 to request IP address allocation therefrom. In response to the IP address allocation request, the PDSN 300 allocates an IP address to the host mobile communication terminal 100 requesting the IP address allocation, and sends the allocated IP address to the host mobile communication terminal 100 over the packet data core network 320.

Upon receiving the IP address, the host mobile communication terminal 100 sends an SMS message including the allocated IP address and a list of data to be provided, to the SMS server 200. Thereafter, SMS server 200 transfers the SMS message sent from the host mobile communication terminal 100 to each of the client mobile communication terminals 420 and 440.

Once the host mobile communication terminal 100 is allocated the IP address from the PDSN 300, a PPP channel for the packet data communication is established between the host mobile communication terminal 100 and the PDSN 300.

Additionally, the host mobile communication terminal 100 separately stores subscriber information (telephone number) of each of the client mobile communication terminals 420 and 440, input or selected for sending the SMS message. The stored subscriber information is used as authentication information when the client mobile communication terminals 420 and 440 each access the host mobile communication terminal 100 at a later time.

2) An operation in which the client mobile communication terminals 420 and 440 access the host mobile communication terminal 100

Upon receiving the SMS message with the IP address of the host mobile communication terminal 100, the client mobile communication terminals 420 and 440 each run the client program to attempt access to the host mobile communication terminal 100. The client mobile communication terminals 420 and 440 each request IP address allocation from the PDSN 300 via the packet data core network 320. If the client mobile communication terminals 420 and 440 are allocated unique IP addresses from the PDSN 300, respectively, they each utilize their allocated IP addresses as source IP addresses.

Once the client mobile communication terminals 420 and 440 are allocated the IP addresses from the PDSN 300, a PPP channel for the packet data communication is set up between each of the client mobile communication terminals 420 and 440 and the PDSN 300.

If a PPP connection is established, the client mobile communication terminals 420 and 440 each attempt access to the host mobile communication terminal 100 via the packet data core network 320. At this time, the IP address of the host mobile communication terminal 100, included in the SMS message, is used as a destination IP address for access.

3) An operation in which the host mobile communication terminal 100 establishes a channel for the packet data communication with each of the client mobile communication terminals 420 and 440

If the host mobile communication terminal 100 and the client mobile communication terminals 420 and 440 are interconnected for packet data communication by the PDSN 300 via the packet data core network 320, the client mobile communication terminals 420 and 440 each send authentication information and a parameter (download request parameter) of data requested to be sent for downloading, to the host mobile communication terminal 100. Here, the authentication information includes actual subscriber information (telephone number) of a corresponding one of the client mobile communication terminals 420 and 440. The download request parameter includes a list of data requested to be sent for downloading, contained in the SMS message sent from the host mobile communication terminal 100.

Upon receiving the authentication information from each of the client mobile communication terminals 420 and 440, the host mobile communication terminal 100 determines whether the subscriber information (telephone number) included in the received authentication information exists in the subscriber information (telephone number) list. If the subscriber information contained in the received authentication information is includes in the subscriber information list, the host mobile communication terminal 100 maintains a packet data communication channel connected with each of the client mobile communication terminals 420 and 440. However, if the subscriber information in the received authentication information is not in the subscriber information list, the host mobile communication terminal 100 releases the connected packet data communication channel.

4) An operation in which the host mobile communication terminal 100 provides data to the client mobile communication terminals 420 and 440

The host mobile communication terminal 100 determines data to be sent to each of the client mobile communication terminals 420 and 440 on the basis of the requested data list included in the download request parameter sent from each of the client mobile communication terminals 420 and 440. If the requested data list in the download request parameter is in the list of the data to be provided, the host mobile communication terminal 100 sends the data of the requested data list to each of the client mobile communication terminals 420 and 440 through the PDSN 300.

When the host mobile communication terminal 100 completes the sending of the data requested by each of the client mobile communication terminals 420 and 440, it releases the corresponding PPP channel.

5) An operation in which the client mobile communication terminals 420 and 440 download data The client mobile communication terminals 420 and 440 each temporarily store the data provided from the host mobile communication terminal 100 in a flash memory, which is a temporary storage space, while downloading it through the PDSN 300. Upon completing the downloading of the data, the client mobile communication terminals 420 and 440 each display information asking a user whether to store the downloaded data. If the user enters a storage command, each of the client mobile communication terminals 420 and 440 stores the temporarily stored data in a storage space corresponding to the type thereof.

Figure 3:
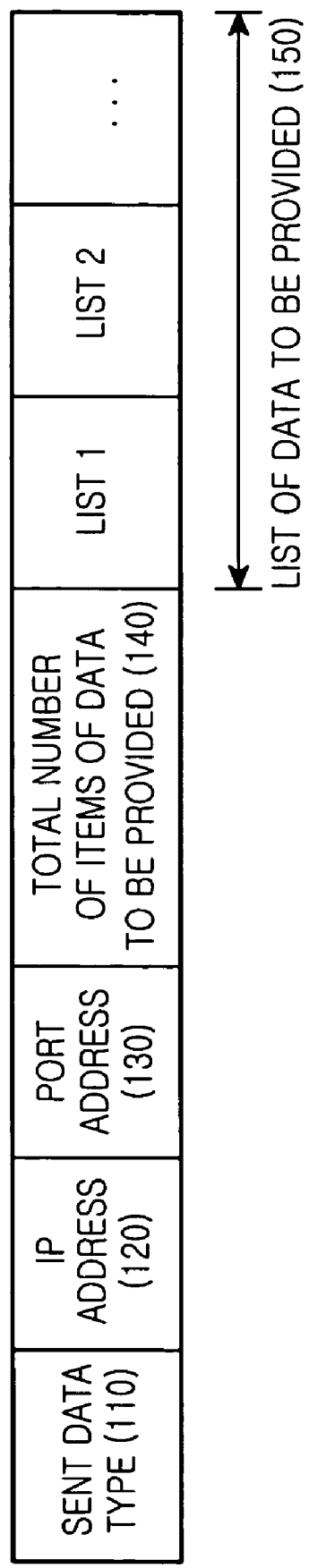
FIG. 3 illustrates a format of a short message service (SMS) message that is sent from a host mobile communication terminal to a client mobile communication terminal in FIG. 2.

FIG. 3 illustrates a format of the SMS message that is sent from the host mobile communication terminal 100 to each of the client mobile communication terminals 420 and 440 in FIG. 2. As illustrated in FIG. 3, the SMS message contains sent data type information 110, IP address information 120, port address information 130, information 140 about the total number of items of data to be provided, and information 150 about a list of the data to be provided. The sent data type information 110 is information about the type of sent data. In the present embodiment, the sent data type information 110 represents that the sent data is of an SMS message type.

The IP address information 120 is information about an IP address allocated to the host mobile communication terminal 100. The port address information 130 is information about a port address for access to the server program (socket server application program), which is run in the host mobile communication terminal 100.

The total data item number information 140 is information about the total number of items of data to be sent from the host mobile communication terminal 100 to each of the client mobile communication terminals 420 and 440, and the data list information 150 is information about a list of data to be sent correspondingly to the total data item number information 140.

Figure 4:
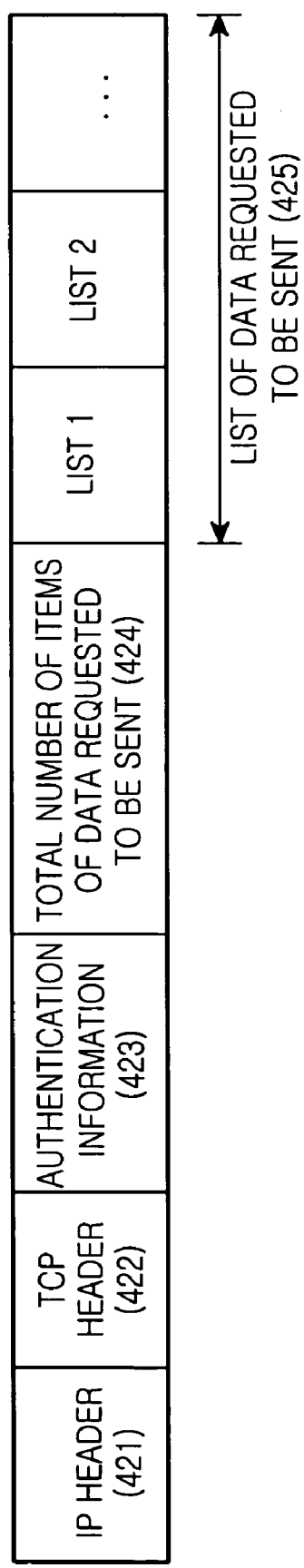
FIG. 4 illustrates a format of a download request parameter that is sent from the client mobile communication terminal to the host mobile communication terminal in FIG. 2.

FIG. 4 illustrates a format of the download request parameter that is sent from each of the client mobile communication terminals 420 and 440 to the host mobile communication terminal 100 in FIG. 2. As illustrated in FIG. 4, the download request parameter includes an IP header 421, a transmission control protocol (TCP) header 422, authentication information 423, information 424 about the total number of items of data requested to be sent for downloading, and information 425 about a list of the data requested to be sent for downloading. The IP header 421 includes IP addresses of the host mobile communication terminal 100 and a corresponding one of the client mobile communication terminals 420 and 440. The TCP header 422 includes TCP information of the host mobile communication terminal 100 and the corresponding client mobile communication terminal. The authentication information 423 contains subscriber information (telephone number) of the corresponding client mobile communication terminal.

The total data item number information 424 is information about the total number of items of data that the corresponding client mobile communication terminal requests the host mobile communication terminal 100 to send for downloading, and the data list information 425 is information about a list of data requested to be sent for downloading correspondingly to the total data item number information 424.

Figure 5:
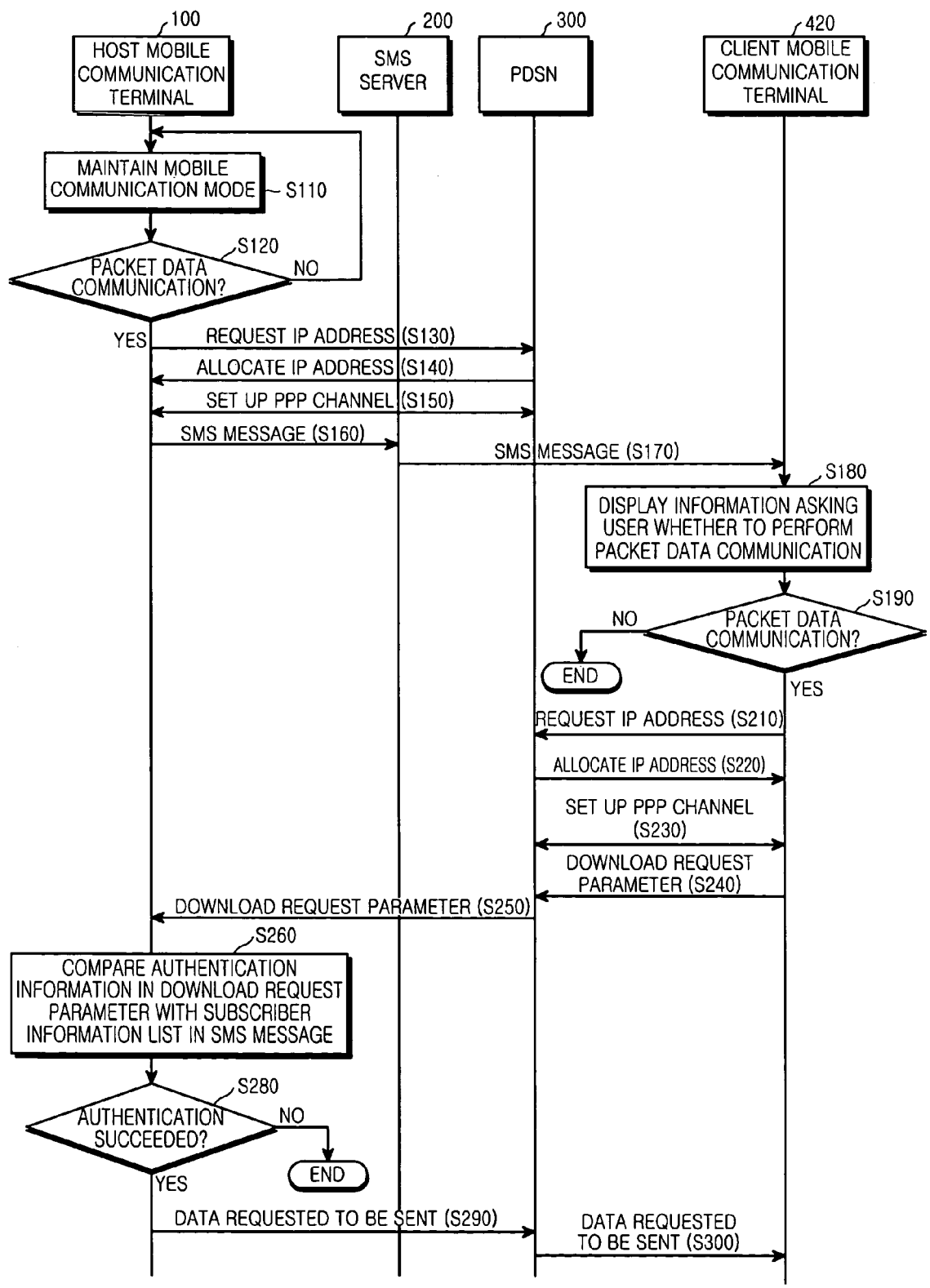
FIG. 5 is a flow chart illustrating a preferred embodiment of a packet data exchange method using the mobile communication system according to the present invention.

FIG. 5 is a flow chart illustrating a preferred embodiment of a packet data exchange method using the mobile communication system according to the present invention. Referring to FIG. 5, the host mobile communication terminal 100 maintains a mode for standard mobile communication in step S110. While maintaining the standard mobile communication mode, the host mobile communication terminal 100 determines whether a command for packet data communication is input in step S120.

If the packet data communication command is input, the host mobile communication terminal 100 requests an IP address for packet data communication from the PDSN 300 in step S130. The PDSN 300 allocates the IP address to the host mobile communication terminal 100 requesting it and sends the allocated IP address thereto in step S 140.

Once the host mobile communication terminal 100 is allocated the IP address from the PDSN 300, a PPP channel for the packet data communication is established between the host mobile communication terminal 100 and the PDSN 300 in step S 150. If the PPP channel is set up, the host mobile communication terminal 100 sends an SMS message containing the allocated IP address and a list of data to be provided, to the client mobile communication terminal 420 via the SMS server 200 in steps S160 and S170.

If the client mobile communication terminal 420 receives the SMS message, then it confirms the IP address and the data list contained in the received SMS message and displays information asking a user whether to perform the packet data communication to request sending of data corresponding to the data list in step S180. The client mobile communication terminal 420 then determines whether a command for the packet data communication is input in step S190.

When the packet data communication command is input, the client mobile communication terminal 420 sends an IP address request signal to the PDSN 300 in step S210. The PDSN 300 allocates an IP address to the client mobile communication terminal 420 requesting it and sends the allocated IP address thereto in step S220.

Once the client mobile communication terminal 420 is allocated the IP address from the PDSN 300, a PPP channel for the packet data communication is established between the client mobile communication terminal 420 and the PDSN 300 in step S230.

The client mobile communication terminal 420 then sends a download request parameter to the PDSN 300 under the condition of setting the allocated IP address as a source address and the IP address contained in the SMS message as a destination address, respectively, in step S240. The download request parameter contains a list of data requested to be sent for downloading existing in the list of the data to be provided and authentication information (telephone number) of the client mobile communication terminal 420.

The PDSN 300 transfers the download request parameter sent from the client mobile communication terminal 420 to the host mobile communication terminal 100 in step S250. The host mobile communication terminal 100 performs authentication by comparing the authentication information contained in the download request parameter with a subscriber information (telephone number) list contained in the SMS message in step S260. At this time, the host mobile communication terminal 100 determines success or failure of the authentication according to whether the authentication information exists in the subscriber information (telephone number) list in step S280.

Upon determining that the authentication has succeeded, the host mobile communication terminal 100 reads the data of the requested data list contained in the download request parameter and sends it to the PDSN 300 in step S290.

At this time, the IP address of the host mobile communication terminal 100 is a source address and the IP address of the client mobile communication terminal 420 is a destination address. The PDSN 300 transfers the data sent from the host mobile communication terminal 100 to the client mobile communication terminal 420 in step S300.

Upon completion of the sending and reception of the data requested by the client mobile communication terminal 420, the host mobile communication terminal 100 and client mobile communication terminal 420 each release the corresponding PPP channel with the PDSN 300.

Figure 6:
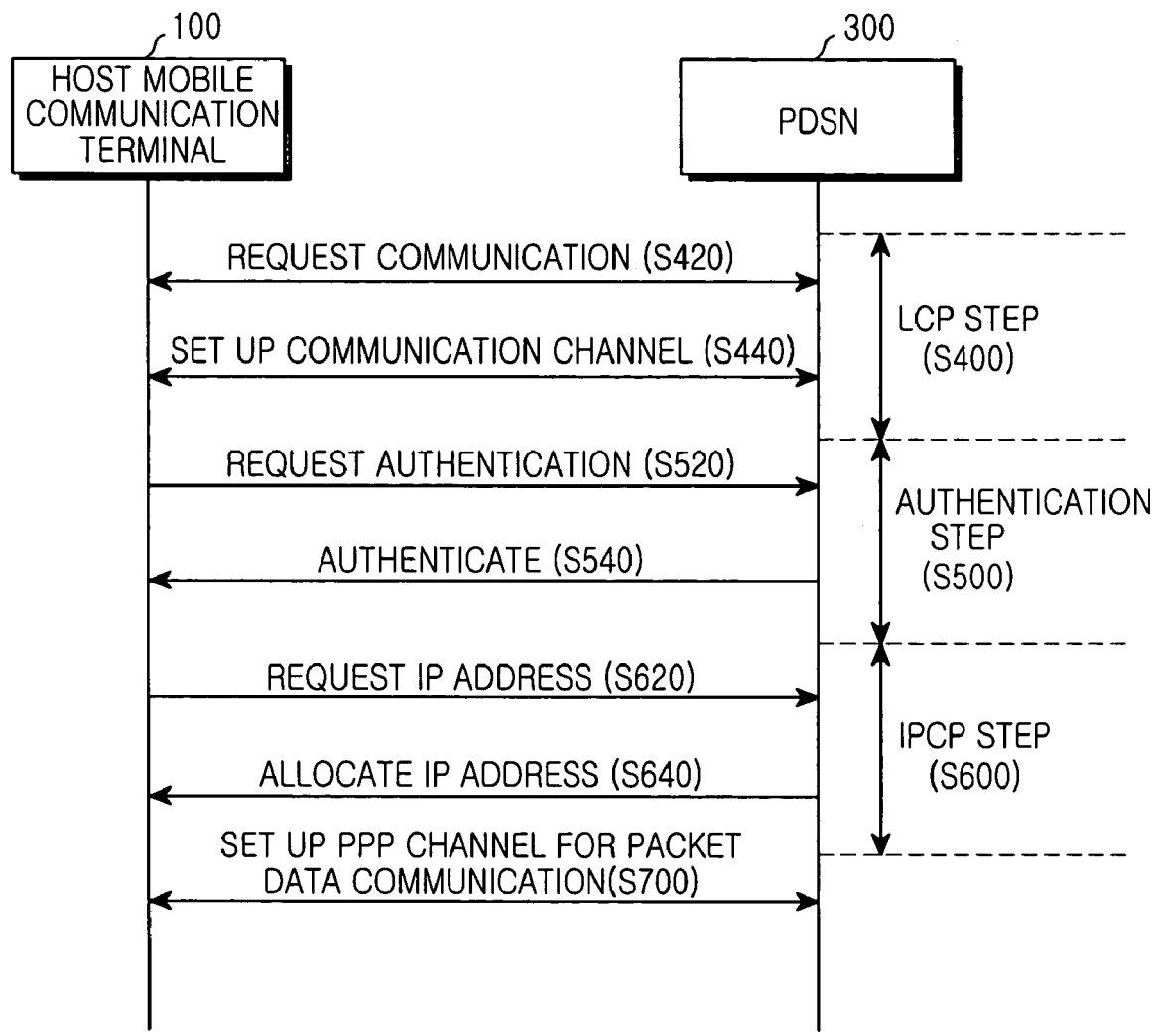
FIG. 6 is a flow chart illustrating in detail the step in FIG. 5 of setting up a point-to-point protocol channel for the packet data communication between each of the host mobile communication terminal and client mobile communication terminal and a packet data serving node (PDSN).

FIG. 6 is a flow chart illustrating in more detail the step of establishing the PPP channel for the packet data communication between each of the host mobile communication terminal 100 and client mobile communication terminal 420 and the PDSN 300. The PPP channels are set up respectively between the host mobile communication terminal 100 and client mobile communication terminal 420 and the PDSN 300 in the same manner. Therefore, only a process of establishing the corresponding PPP channel between the host mobile communication terminal 100 and the PDSN 300 will be described with reference to FIG. 6.

As illustrated in FIG. 6, the process of establishing the PPP channel between the host mobile communication terminal 100 and the PDSN 300 can be broken down into a link control protocol (LCP) step S400, an authentication step S500, and an Internet protocol control protocol (IPCP) step S600. More specifically, the host mobile communication terminal 100 and the PDSN 300 request communication of each other through negotiation therebetween in step S420. The host mobile communication terminal 100 and the PDSN 300 then set up a communication channel therebetween in response to the communication requests from each other in step S440.

If the communication channel is set up between the host mobile communication terminal 100 and the PDSN 300, the host mobile communication terminal 100 requests authentication from the PDSN 300 in step S520. In response to the authentication request from the host mobile communication terminal 100, the PDSN 300 authenticates the host mobile communication terminal 100 and sends the resulting authentication signal to the terminal 100 in step S540.

If the communication channel with the PDSN 300 is established and the authentication by the PDSN 300 is completed, the host mobile communication terminal 100 requests an IP address for the packet data communication from the PDSN 300 in step S620). In response to the IP address request, the PDSN 300 determines whether there is an IP address to be allocated. If there is an IP address to be allocated, the PDSN 300 allocates the IP address to the host mobile communication terminal 100 and sends the allocated IP address thereto in step S640.

Finally, the host mobile communication terminal 100 establishes a PPP channel for the packet data communication with the PDSN 300 in step S700.

As is apparent from the description above, according to the present invention, a host mobile communication terminal sends an SMS message including a list of data to be provided and an IP address for packet data communication. At least one client mobile communication terminal sends a list of data requested to be sent for downloading and authentication information to the host mobile communication terminal over PPP channels set up for the packet data communication. The host mobile communication terminal then sends the data requested by the client mobile communication terminal thereto over the PPP channels. Therefore, data can be exchanged between the host mobile communication terminal and the client mobile communication terminal, without using a separate physical device or means for data exchange.

Moreover, the packet data communication is performed by establishing the PPP channels between the host mobile communication terminal and the client mobile communication terminal through a PDSN, resulting in improvements in mobility for data exchange and simplicity and convenience thereof.

Although preferred embodiments of the present invention have been disclosed for illustrative purposes, those skilled in the art will appreciate that various modifications, additions and substitutions are possible, without departing from the scope and spirit of the present invention as disclosed in the accompanying claims.

What is claimed is:

1. A mobile communication system for exchanging packet data between a host mobile communication terminal and at least one client mobile communication terminal, comprising:
a packet data serving node (PDSN) for allocating first and second Internet protocol (IP) addresses to said host mobile communication terminal and said at least one client mobile communication terminal, respectively, and establishing first and second point-to-point protocol (PPP) channels with said host mobile communication terminal and said at least one client mobile communication terminal, respectively; and
a short message service (SMS) server for providing an SMS service to said host mobile communication terminal and said at least one client mobile communication terminal;
said host mobile communication terminal receives said first IP address allocated from said PDSN, sets up said first PPP channel with said PDSN using the first IP address, sends an SMS message including said first IP address and a list of data to be provided, to said SMS server, and upon receiving a list of data requested to be sent existing in the list of the data to be provided, sends the data of the requested data list to said PDSN through an authentication process; and
said at least one client mobile communication terminal receives said second IP address allocated from said PDSN, sets up said second PPP channel with said PDSN using the second IP address, sends a download request parameter including said requested data list selected from said list of said data to be provided, to said host mobile communication terminal via said PDSN, and receives said data of said requested data list sent from said host mobile communication terminal;
wherein said host mobile communication terminal includes a socket server application program for managing transmission of data that is requested from each of the client mobile communication terminals, said client mobile communication terminal includes a socket client application program for accessing the host mobile communication terminal.

2. The mobile communication system as set forth in claim 1, wherein said SMS message comprises:
sent data type information;
information about said first IP address and a port address of said host mobile communication terminal;
information about a total amount of the data to be provided from said host mobile communication terminal; and
information about said list of said data to be provided from said host mobile communication terminal.

3. The mobile communication system as set forth in claim 1, wherein said download request parameter comprises:
an IP header including said first and second IP addresses of said host mobile communication terminal and at least one client mobile communication terminal;
a transmission control protocol (TCP) header including TCP information of said host mobile communication terminal and at least one client mobile communication terminal;
authentication information including subscriber information of said client mobile communication terminal;
information about a total amount of the data requested by said client mobile communication terminal to be sent; and
information about said list of said data requested by said client mobile communication terminal to be sent.

4. The mobile communication system as set forth in claim 1, wherein said host mobile communication terminal stores a list of subscriber information of destination client mobile communication terminals when sending said SMS message, performs said authentication process in such a manner that it compares said authentication information contained in said download request parameter with the stored subscriber information list and authenticates a client mobile communication terminal, if said authentication information exists in said subscriber information list, and sends said data of said requested data list to said client mobile communication terminal via said PDSN, if said client mobile communication terminal is authenticated.

5. The mobile communication system as set forth in claim 1, wherein said at least one client mobile communication terminal displays information asking a user whether to request sending of data corresponding to said list of said data to be provided, upon receiving said SMS message sent from said host mobile communication terminal via said SMS server, requests and receives said second IP address from said PDSN, upon receiving a signal to request the sending of the data corresponding to said list of said data to be provided, and sends the download request parameter including the list of the requested data to said host mobile communication terminal via said PDSN.

6. The mobile communication system as set forth in claim 1, wherein:
    each of said host mobile communication terminal and said at least one client mobile communication terminal, and said PDSN request communication of each other to set up a communication channel therebetween;
    said host mobile communication terminal and said at least one client mobile communication terminal each request authentication from said PDSN over the set-up communication channel, request a corresponding one of said first and second IP addresses from said PDSN, if authenticated by said PDSN, and set up a corresponding one of said first and second PPP channels, if allocated the corresponding IP address from said PDSN.

7. A method for exchanging packet data between a host mobile communication terminal and at least one client mobile communication terminal using a mobile communication system, said method comprising the steps of:
    requesting, by the host mobile communication terminal, a first Internet protocol (IP) address from a packet data serving node (PDSN);
    establishing a first point-to-point protocol (PPP) channel between the host mobile communication terminal and the PDSN using said first IP address;
    sending an SMS message including said first IP address and a list of data to be provided, to said at least one client mobile communication terminal from the host mobile communication terminal, via a short message service SMS server;
    requesting, by at least one client mobile communication terminal, a second IP address from said PDSN;
    establishing a second PPP channel between the at least one client mobile communication terminal and the PDSN using a second IP address from said PDSN;
    sending a download request parameter including a list of the requested data from the at least one client mobile communication terminal to said host mobile communication terminal, via said PDSN;
    sending the data of said requested data list from said host mobile communication terminal to said PDSN through an authentication process, upon receiving said download request parameter; and
    sending the data of said requested data list from said PDSN to said at least one client mobile communication terminal;
    wherein said host mobile communication terminal includes a socket server application program for managing transmission of data that is requested from each of the client mobile communication terminals, said client mobile communication terminal includes a socket client application program for accessing the host mobile communication terminal.

8. The method as set forth in claim 7, wherein said SMS message includes:
    sent data type information;
    information about said first IP address and a port address of said host mobile communication terminal;
    information about a total amount said data to be provided from said host mobile communication terminal; and
    information about said list of said data to be provided from said host mobile communication terminal.

9. The method as set forth in claim 7, wherein said download request parameter includes:
    an IP header including said first and second IP addresses of said host mobile communication terminal and said at least one client mobile communication terminal;
    a transmission control protocol (TCP) header including TCP information of said host mobile communication terminal and said at least one client mobile communication terminal;
    authentication information including subscriber information of said at least one client mobile communication terminal;
    information about a total amount of said data requested by said at least one client mobile communication terminal to be sent; and
    information about said list of said data requested by said at least one client mobile communication terminal to be sent.

10. The method as set forth in claim 9, wherein said authentication process comprises the steps of:
    comparing, by said host mobile communication terminal, said authentication information contained in said download request parameter with a list of subscriber information of destination client mobile communication terminals to which said SMS message is sent; and
    authenticating, by said host mobile communication terminal, said at least one client mobile communication terminal, if said authentication information exists in said subscriber information list.

11. The method as set forth in claim 7, further comprising the steps of:
    displaying, by said at least one client mobile communication terminal, information asking a user whether to request the sending of the data corresponding to said list of said data to be provided; and
    requesting, by said at least one client mobile communication terminal, said second IP address from said PDSN, upon receiving a signal to request the sending of said data corresponding to said list of said data to be provided.

12. The method as set forth in claim 7, wherein the step of establishing the first and second PPP channels, each comprise the steps of:
    requesting a communication channel with the PDSN;
    requesting authentication from said PDSN over the set-up communication channel;
    requesting at least one of said first and second IP addresses from said PDSN, if authenticated by said PDSN; and
    establishing at least one of said first and second PPP channels, if allocated at least one of said first and second IP addresses, respectively, from said PDSN.

* * * * *